(12) United States Patent
Pozdol et al.

(10) Patent No.: US 12,107,280 B2
(45) Date of Patent: Oct. 1, 2024

(54) ZINC-AIR ELECTROCHEMICAL CELLS WITH CARBON DIOXIDE SCAVENGERS

(71) Applicant: Energizer Brands, LLC, St. Louis, MO (US)

(72) Inventors: Ian Pozdol, St. Louis, MO (US); Marc Syvertsen, St. Louis, MO (US); Tony Rubsam, St. Louis, MO (US); Kokkie Schnetz, St. Louis, MO (US)

(73) Assignee: Energizer Brands, LLC, St. Louis, MO (US)

( * ) Notice: Subject to any disclaimer, the term of this patent is extended or adjusted under 35 U.S.C. 154(b) by 532 days.

(21) Appl. No.: 16/714,307

(22) Filed: Dec. 13, 2019

(65) Prior Publication Data
US 2020/0194738 A1   Jun. 18, 2020

Related U.S. Application Data

(60) Provisional application No. 62/780,158, filed on Dec. 14, 2018.

(51) Int. Cl.
*H01M 12/06* (2006.01)
*H01M 50/117* (2021.01)
(Continued)

(52) U.S. Cl.
CPC ....... *H01M 50/1385* (2021.01); *H01M 12/06* (2013.01); *H01M 50/117* (2021.01); *H01M 50/119* (2021.01); *H01M 50/121* (2021.01); *H01M 50/124* (2021.01); *H01M 50/129* (2021.01); *H01M 50/14* (2021.01)

(58) Field of Classification Search
CPC ............ H01M 4/06; H01M 4/38; H01M 4/62; H01M 4/8605; H01M 4/8663; H01M 50/13585; H01M 50/116; H01M 50/124; H01M 50/109; H01M 50/117; H01M 50/119; H01M 50/121; H01M 50/129; H01M 50/14; H01M 50/145
See application file for complete search history.

(56) References Cited

U.S. PATENT DOCUMENTS 4,054,725 A * 10/1977 Tuburaya ............ H01M 8/0662
429/410
5,432,022 A * 7/1995 Cheiky ............... H01M 8/0662
429/405
(Continued)

FOREIGN PATENT DOCUMENTS

JP    47-018718 U    6/1972
JP    47-025912 U    11/1972
(Continued)

OTHER PUBLICATIONS

International Search Report and Written Opinion in International Patent Application No. PCT/US2019/066402 dated Feb. 24, 2020.

*Primary Examiner* — Helen Oi K Conley
*Assistant Examiner* — Amanda Rosenbaum
(74) *Attorney, Agent, or Firm* — Foley & Lardner LLP (57) ABSTRACT

A zinc-air battery includes an air cathode, a zinc anode, an electrolyte, and a housing, wherein the zinc-air battery includes a carbon dioxide scrubbing agent. A packaging for a zinc-air battery, wherein the packing includes a chamber having a carbon dioxide scrubbing agent, and the chamber is configured to contain the zinc-air battery during storage.

7 Claims, 6 Drawing Sheets

(51) Int. Cl.
*H01M 50/119* (2021.01)
*H01M 50/121* (2021.01)
*H01M 50/124* (2021.01)
*H01M 50/129* (2021.01)
*H01M 50/138* (2021.01)
*H01M 50/14* (2021.01)

(56) References Cited

U.S. PATENT DOCUMENTS

| | | | |
|---|---|---|---|
| 5,595,949 A | 1/1997 | Goldstein et al. | |
| 5,716,726 A | 2/1998 | Cheiky | |
| 9,368,819 B1 | 6/2016 | Gottesfeld | |
| 2004/0129717 A1* | 7/2004 | Gauthier | H01M 50/216 221/25 |
| 2005/0003271 A1* | 1/2005 | Jiang | H01M 4/622 429/207 |
| 2005/0255339 A1* | 11/2005 | Tsai | H01M 4/38 429/529 |
| 2006/0115724 A1* | 6/2006 | Buckle | H01M 50/133 148/675 |
| 2008/0096061 A1* | 4/2008 | Burchardt | H01M 8/083 429/405 |
| 2008/0145737 A1 | 6/2008 | Cai et al. | |
| 2008/0160413 A1* | 7/2008 | Dopp | H01M 12/06 429/246 |
| 2009/0028841 A1 | 1/2009 | Gohil | |
| 2011/0111287 A1* | 5/2011 | Sayre | H01M 4/92 977/734 |
| 2015/0047989 A1 | 2/2015 | Huang | |
| 2015/0111115 A1* | 4/2015 | Nitta | H01M 12/06 429/405 |
| 2017/0237134 A1* | 8/2017 | Guha | H01M 10/4235 429/406 |
| 2018/0114978 A1 | 4/2018 | Armacanqui et al. | |

FOREIGN PATENT DOCUMENTS

| | | | |
|---|---|---|---|
| JP | 49-005534 B | 2/1974 | |
| JP | 49-031370 Y | 8/1974 | |
| JP | 49-031371 Y | 8/1974 | |
| JP | 59-098479 A | 6/1984 | |
| JP | 62-272478 A | 11/1987 | |
| JP | 2000-003735 A | 1/2000 | |
| JP | 2002-532857 | 10/2002 | |
| JP | 2003-151647 A | 5/2003 | |
| JP | 2007-141745 A | 6/2007 | |
| JP | 2015-079692 A | 4/2015 | |
| WO | WO-0036690 A2 * | 6/2000 | H01M 10/46 |
| WO | WO-2007144357 A1 * | 12/2007 | H01M 10/26 |

\* cited by examiner

ZINC-AIR ELECTROCHEMICAL CELLS WITH CARBON DIOXIDE SCAVENGERS

CROSS-REFERENCE TO RELATED APPLICATION

This application claims the benefit of and priority to U.S. Provisional Application 62/780,158, filed Dec. 14, 2018, the entire contents of which are incorporated herein by reference.

FIELD

The present technology is generally related to the field of zinc-air batteries and the uses thereof.

SUMMARY

In one aspect, a zinc-air battery comprising an air cathode, a zinc anode, an electrolyte, and a housing, wherein the zinc-air battery comprises a carbon dioxide scrubbing agent.

In another aspect, a packaging for a zinc-air battery, wherein the packaging comprises a chamber comprising a carbon dioxide scrubbing agent, and the chamber is configured to contain the zinc-air battery during storage.

The foregoing summary is illustrative only and is not intended to be in any way limiting. In addition to the illustrative aspects, embodiments and features described above, further aspects, embodiments and features will become apparent by reference to the following drawings and the detailed description.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term—for example, "about 10 wt. %" would be understood to mean "9 wt. % to 11 wt. %." It is to be understood that when "about" precedes a term, the term is to be construed as disclosing "about" the term as well as the term without modification by "about"—for example, "about 10 wt. %" discloses "9 wt. % to 11 wt. %" as well as disclosing "10 wt. %."

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The term "amine" (or "amino") as used herein refers to —$NR^{100}R^{101}$ groups, wherein $R^{100}$ and $R^{101}$ are independently hydrogen, or a substituted or unsubstituted alkyl, alkenyl, alkynyl, cycloalkyl, aryl, aralkyl, heterocyclylalkyl or heterocyclyl group as defined herein. In some embodiments, the amine is alkylamino, dialkylamino, arylamino, or alkylarylamino. In other embodiments, the amine is $NH_2$, methylamino, dimethylamino, ethylamino, diethylamino, propylamino, isopropylamino, phenylamino, or benzylamino.

As used herein, the term "zinc anode" refers to an anode that includes zinc as an anode active material.

As used herein, the term "ppm" means parts per million by weight, unless explicitly expressed otherwise.

Zinc-air cells rely on atmospheric oxygen for reactions that generate electric current. However, as will be appreciated, this exposes the cell to atmospheric carbon dioxide, which can react with the cell's alkaline electrolyte. Such reactions reduce the cell discharge performance by reducing electrolyte conductivity and/or interfering with cathode performance by clogging of the cathode pores of the air diffusion membrane, where the reaction with air takes place. Increases in the concentration of carbon dioxide in the atmosphere due to poor room ventilation, increased human activity, and other factors, magnifies the severity of the effect, reducing cell-life of the zinc-air cells. This is exemplified in Example 9, Table 1 of the present disclosure.

It has now been found that seeding of a cell with materials that react with carbon dioxide, i.e. "a carbon dioxide scrubbing agent," helps to improve cell-performance and life. As the air enters the cell, the carbon dioxide reacts with the carbon dioxide scrubber, to prevent, or at least minimize, the reaction of the carbon dioxide with alkaline components in the electrolyte or at the surface of an air diffusion membrane. The scrubbers allow for the conductivity of the electrolyte and the cathode porosity to be maintained for an extended period of time. Alternatively, the electrolyte can be seeded with materials that preferentially react with dissolved carbon dioxide prior to reaction with alkali hydroxides that are present in the electrolyte.

Illustrative carbon dioxide scrubbers include, but are not limited to, a basic hydroxide salt, soda lime, sodium bicarbonate, lithium peroxide, lithium oxide, an amine-bearing compound, an olivine, or a combination of any two or more of thereof. For example, in any embodiment disclosed herein, it may be the carbon dioxide scrubbing agent includes lithium hydroxide, potassium hydroxide, sodium hydroxide, calcium hydroxide, soda lime, sodium bicarbonate, lithium peroxide, lithium oxide, monoethanolamine, diethanolamine, an olivine, or a combination of any two or more thereof.

In any embodiment herein, it may be that the carbon dioxide scrubbing agent is combined with a hygroscopic material. Illustrative hygroscopic materials include, but are not limited to, a polyvinyl alcohol, a polyacrylic acid, a carboxylmethyl cellulose, or similar compounds thereof, and combinations of any two or more thereof. Without being bound by theory, it is believed that the reaction mechanism of many carbon dioxide scrubbing agents is dependent upon the dissolution of carbon dioxide into water and that combination of the carbon dioxide scrubbing agent with a hygroscopic material increases access of the carbon dioxide scrubbing agent to water. In any embodiment herein, it may be that the carbon dioxide scrubbing agent is combined with water. In any embodiment herein, it may be that the carbon dioxide scrubbing agent is combined with a hygroscopic material and water. In any embodiment herein, it may be a weight ratio of carbon dioxide scrubbing agent to water is about 0.001:1 to about 1:0.01—thus the weight ratio of carbon dioxide scrubbing agent to water may be about 0.001:1, about 0.01:1, about 0.05:1, about 0.1:1, about 0.2:1, about 0.3:1, about 0.4:1, about 0.5:1, about 0.6:1, about 0.7:1, about 0.8:1, about 0.9:1, about 1:1, about 1:0.9, about 1:0.8, about 1:0.7, about 1:0.6, about 1:0.5, about 1:0.4, about 1:0.3, about 1:0.2, about 1:0.1, about 1:0.05, about 1:0.01, or any range including and/or in-between any two of these values.

Figure 1:
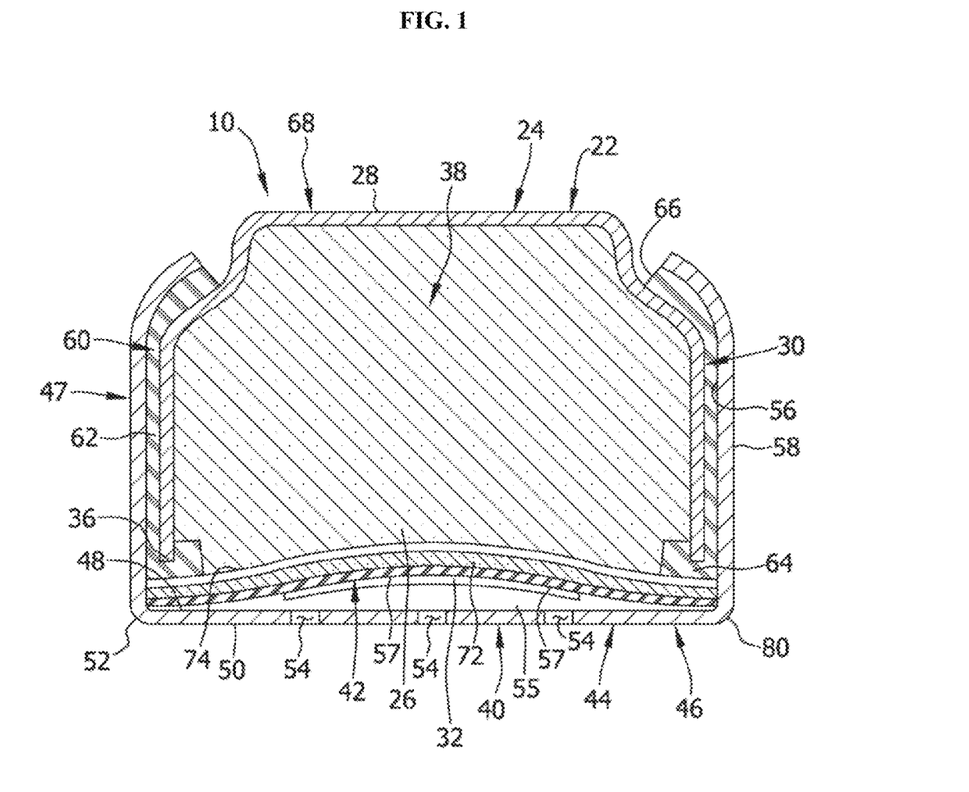
FIG. 1 is a cross-sectional, schematic view depicting an illustrative electrochemical cell.
Figure 2:
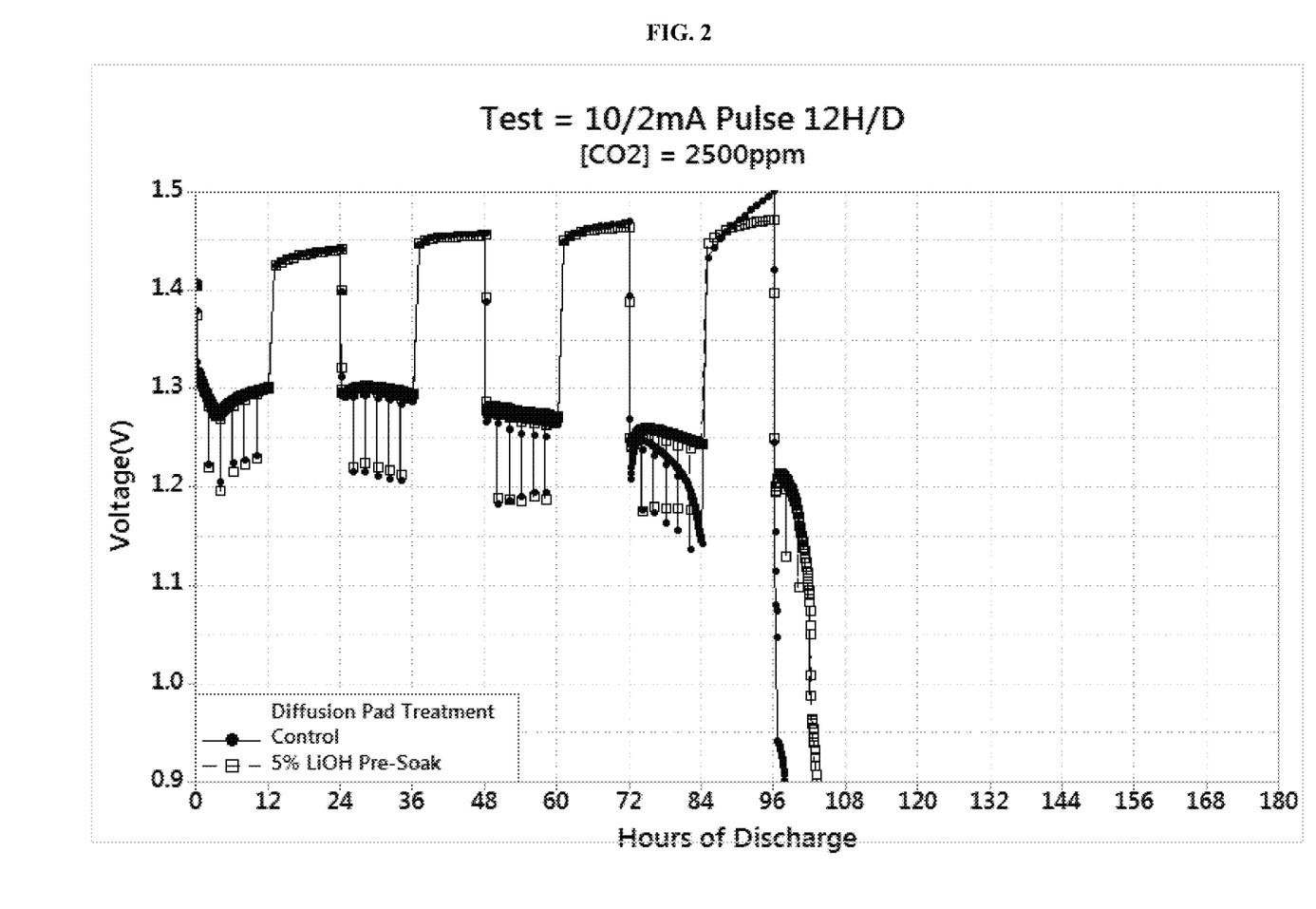
FIG. 2 provides the results of subjecting to a hearing aid standard test a zinc-air battery of the present technology (including a diffusion pad made of polyvinyl alcohol and rayon fibers that was treated with a 5% by weight LiOH solution and subsequently dried) as well as a similar zinc-air battery that included an untreated diffusion pad ("Control"), where the concentration of carbon dioxide ($CO_2$) was 2,500 ppm, according to the working examples.
Figure 3:
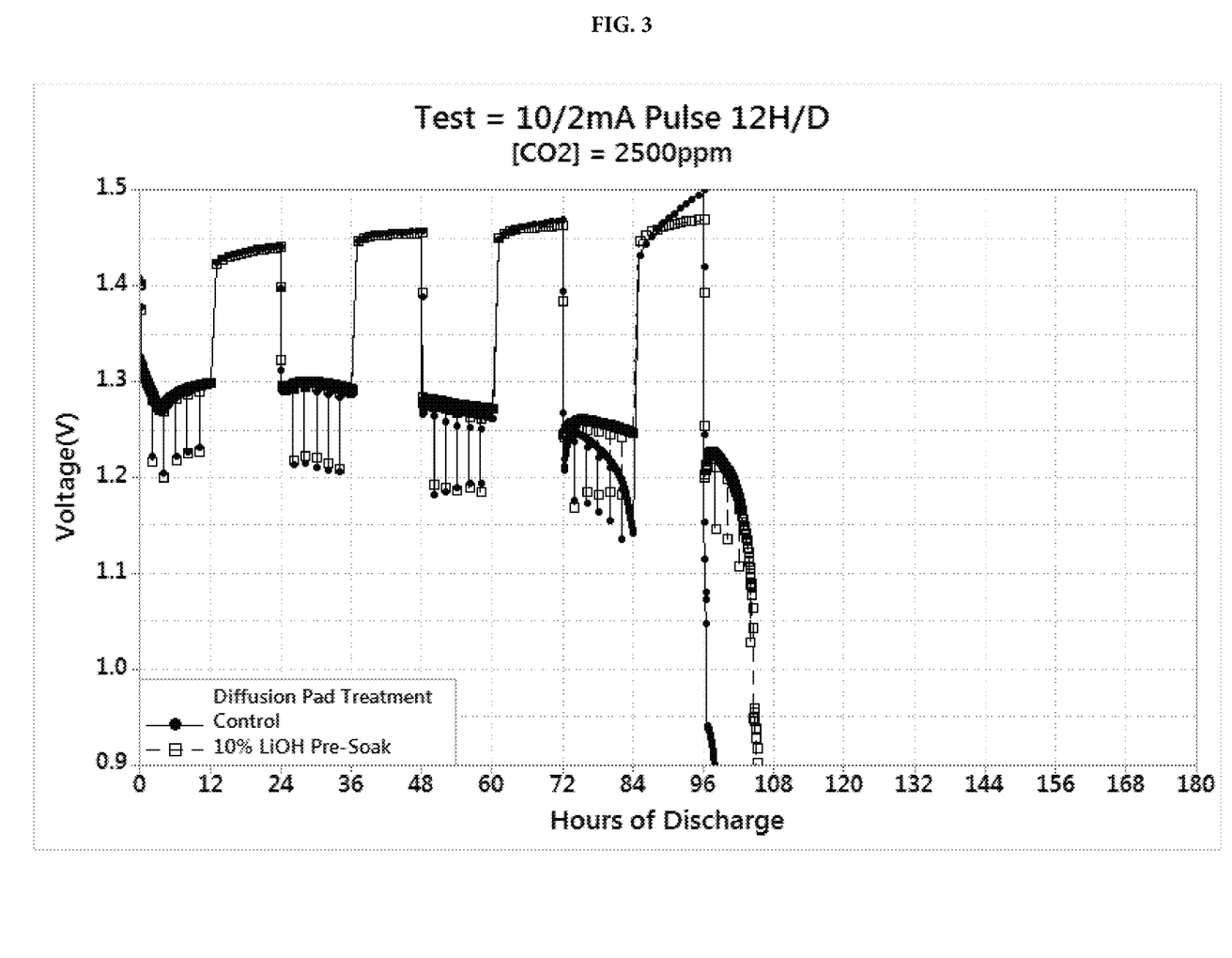
FIG. 3 provides the results of subjecting to a hearing aid standard test a zinc-air battery of the present technology (including a diffusion pad made of polyvinyl alcohol and rayon fibers that was treated with a 10% by weight LiOH solution and subsequently dried) as well as a similar zinc-air battery that included an untreated diffusion pad ("Control"), where the concentration of $CO_2$ was 2,500 ppm, according to the working examples.
Figure 4:
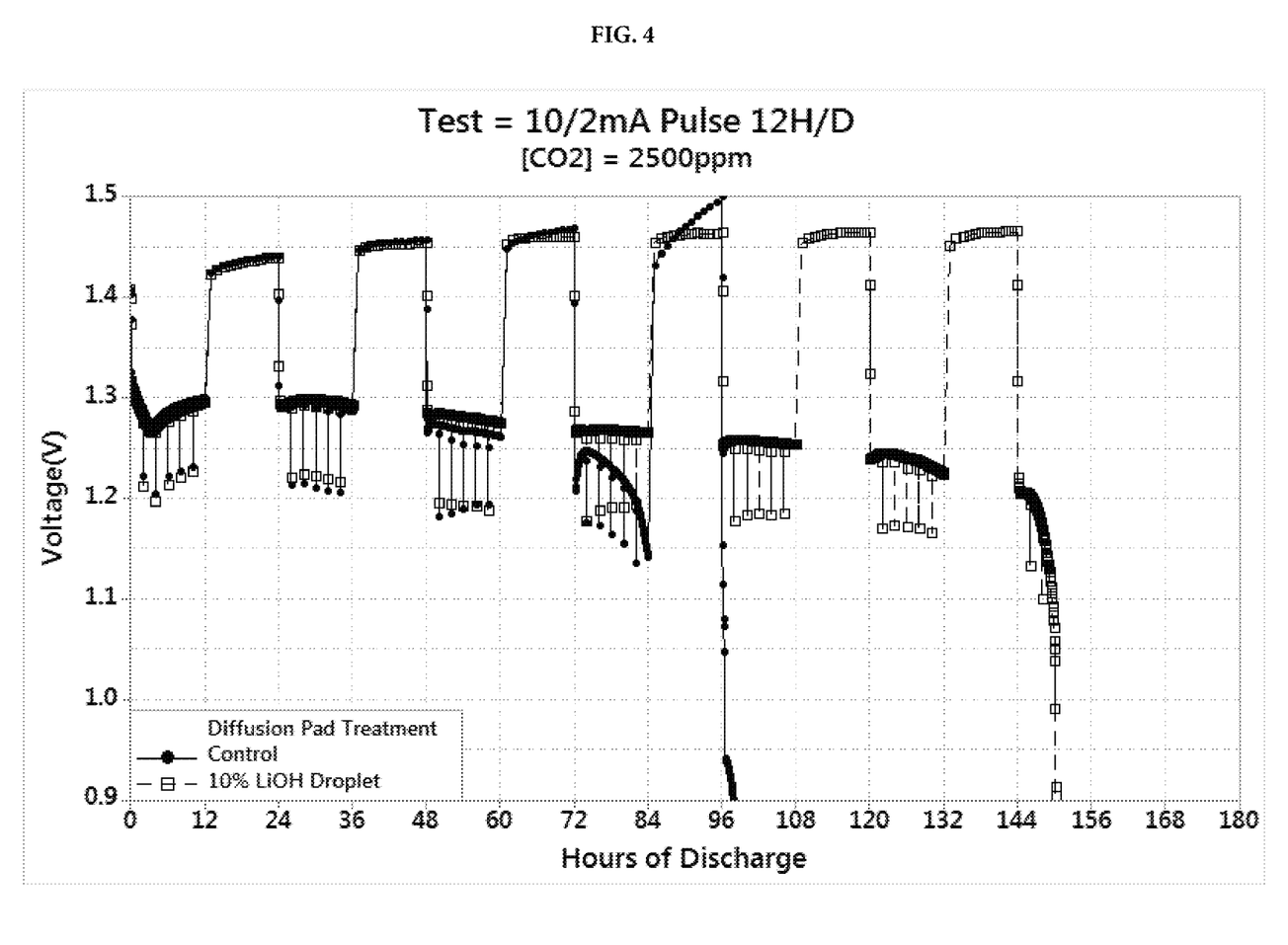
FIG. 4 provides the results of subjecting to a hearing aid standard test a zinc-air battery of the present technology (including a diffusion pad made of polyvinyl alcohol and rayon fibers that was treated with a 10% by weight LiOH solution and not dried) as well as a similar zinc-air battery that included an untreated diffusion pad ("Control"), where the concentration of $CO_2$ was 2,500 ppm, according to the working examples.

According to an embodiment, the carbon dioxide scrubbing agent may be used to coat the inside of the cathode can in a space where entering air may encounter the scrubbing agent prior to contacting the electrolyte and anode active material (i.e. the zinc). For example, as illustrated in FIG. 1, air reservoir 55 is a void space within the battery cell. The cell is configured such that air enters the cell through air ports 54 prior to contacting the diffusion layer 32. Accordingly, the carbon dioxide scrubbing agent may be applied to an interior surface of the cell, within the air reservoir 55, to remove or at least mitigate carbon dioxide as it enters the cell through the air ports 54. The scrubbing agent may also be embedded within or deposited on any of the cellulose air diffusion layer 32, the cathode 42, or the porous diffusion layer 57. The scrubbing agent may be deposited as a powder, as a film by applying it through a solvent that is later removed, or by other practical means.

In another embodiment, the carbon dioxide scrubbing agents may be added to the alkaline electrolyte. In such embodiments, the scrubbing agents are selected such that the material reacts with carbon dioxide first, preserving the NaOH or KOH that is present in the electrolyte. Without being bound by theory, it is believed that as $CO_2$ enters a zinc-air cell, the $CO_2$ can dissolve in the aqueous electrolyte, thereby forming carbonic acid. The carbonic acid may then react with the scrubber prior to reaction with the NaOH or KOH present in the electrolyte, such that the desired alkalinity of the electrolyte is maintained.

In another embodiment, a carbon dioxide scrubbing agent is added to the packaging that contains a hearing aid cell to minimize storage damage due to carbon dioxide exposure, prior to use of the cell. For example, the packaging may contain a chamber which is intended for holding a zinc-air cell, such as a hearing aid battery, for storage or sale. The packaging may include any of the carbon dioxide scrubbing agents as powders, coatings on the packaging materials, or embedded within the plastics or papers that make up the packaging and chamber forming materials. In any embodiment herein, it may be that the carbon dioxide scrubbing agent is combined with a hygroscopic material. Illustrative hygroscopic materials include, but are not limited to, a polyvinyl alcohol, a polyacrylic acid, a carboxylmethyl cellulose, or similar compounds thereof, and combinations of any two or more thereof.

In any embodiment disclosed herein, the zinc-air battery may be configured in accordance or consistent with zinc-air battery cell designs, such as zinc/silver oxide batteries, zinc/manganese dioxide batteries, etc. For example, in various embodiments the zinc-air battery may be designed to specifications suitable for a zinc-air button size battery. In some embodiments, the shape of the zinc-air battery is such that the anode is held in a somewhat flat or pan-shaped position. An exemplary embodiment of a zinc-air battery cell of the present disclosure may be as illustrated in FIG. 1.

Referring specifically to the cell 10 of the zinc-air battery, the negative electrode contains the anode can assembly 22, with an anode can 24 including an electrochemically reactive anode 26 contained therein and an insulating gasket 60. The anode can 24 has a base wall 28, and circumferential downwardly-depending side wall 30. Side walls 30 terminate in a circumferential can foot 36. The base wall and side walls 30 generally define the anode cavity 38 within the anode can 24, which contains the anode 26.

The anode can may include an alloy of copper, which includes copper and metals such as aluminum, silicon, cobalt, tin, chromium, zinc, and mixtures of any two or more thereof. In one embodiment, the entire anode can includes the alloy of copper.

The cathode 42 comprises the area from below the separator 74 to the cathode can 44. This cathode 42 area includes the porous diffusion layer 57, the cellulose air diffusion layer and the cathode active layer 72. Cathode can 44 has a bottom 46, and a circumferential upstanding side wall 47. Bottom 46 has a generally flat inner surface 48, a generally flat outer surface 50, and an outer perimeter 52 defined on the flat outer surface 50. A plurality of air ports 54 extend through the bottom 46 of the cathode can 44, providing avenues for traverse of oxygen through the bottom 46 into the adjacent cathode can assembly 40. An air reservoir 55 spaces the cathode can assembly 40 from bottom 46 and the corresponding air ports 54. A porous diffusion layer 57 and a cellulose air diffusion layer 32 fill the air reservoir 55. Side wall 47 of the cathode can has an inner surface 56 and an outer surface 58.

The anode can assembly 22 is electrically insulated from the cathode can assembly 40 by an insulating gasket 60. Insulating gasket 60 includes a circumferential side wall 62 disposed between the upstanding side wall 47 of the cathode can and the downwardly-depending side wall 30 of the anode can. An insulating gasket foot 64 is disposed generally between the can foot 36 of the anode can and the cathode can assembly 40. An insulating gasket top 66 is positioned at the locus where the side wall 62 of insulating gasket 60 extends from between the side walls 30 and 47 adjacent the top of the cell.

The outer surface 68 of the cell 10 is thus defined by portions of the outer surface of the top of the anode can 24, outer surface 58 of the side wall 47 of the cathode can 44, outer surface 50 of the bottom of the cathode can 44, and the top 66 of the insulating gasket 60.

The insulating gasket may also provide electrical insulation, preventing all effective direct electrical contact between the anode can 24 and the cathode can 44. Accordingly, the side wall 62 of the insulating gasket must circumscribe, and provide electrical insulation properties about, the entirety of the circumference of the battery between outer surface and inner surface 56, generally from the top of side wall 47 to the bottom of side wall 30. Similarly, the foot 64 of the insulating gasket must circumscribe, and provide electrical insulation properties about, the entirety of the circumference of the cell between foot 36 of side wall 30, the lower portion of side wall 47, and the outer perimeter portion of the cathode can assembly 40. The combination of good liquid sealing properties and good electrical insulation properties is typically achieved by molding known battery-grade nylon polymeric material in the desired configuration.

In order to meet the electrical insulation requirements, the insulating gasket may have good dielectric insulation properties, may have a minimum thickness about side wall 62, and may be free of any pinholes or other imperfections that might permit transmission of electric current between side walls 30 and 47. Thickness for the insulating gasket side wall 62 of about 200 to about 250 microns are common in conventional electrochemical cells. Thickness as thin as 100 microns are acceptable for cells of the disclosure, using the same resiliently deformable thermoplastic nylon material as the thicker insulating gaskets of the conventional art.

Depending on the structure of the battery to which the insulating gasket is to be applied, intermediate thicknesses such as, e.g., 150 microns, 140 microns, 127 microns, or the like, may be selected for some cells. However, where cell volume efficiency is a driving consideration, preferred thicknesses are less, for example 120 microns or 110 microns to as thin as 100 microns. Thus, the range of thicknesses for insulating gaskets 60 preferred for use in cells 10 of the disclosure has a lower end of about 100 microns.

In an embodiment, porous diffusion layer 57 is a microporous hydrophobic polymeric material such as a polytetrafluoroethylene (PTFE) membrane about 25 to about 100 microns thick, which permits passage of air therethrough and which is generally impervious to battery electrolyte. In one embodiment, the porous diffusion layer 57 is Teflon™.

In some embodiments, the porous diffusion layer 57, in combination with the air ports 54, is used to efficiently transport oxygen to the active reaction surface area of the cathode assembly.

In an embodiment, the cellulose air diffusion layer 32 is located underneath the porous diffusion layer 57 and acts as a protective lateral air diffusion layer. Specifically, when the cell is activated, the anode can assembly 22 presses down on the separator 74 and the cellulose air diffusion layer 32 helps to protect the air ports 54 from being completely covered.

In an embodiment, active layer 72 further includes a connecting substratum, namely a conductive woven nickel wire layer (not shown), capable of interfacing, as a current collector, with the cathode can. In one embodiment, carbon forms a matrix surrounding the conductive layer of nickel wire. In one embodiment, nickel is used for the conductive layer because nickel exhibits little or no corrosion in the environment of the zinc air cell, and also because nickel is an excellent electrical conductor. In one embodiment, the thickness of the cathode assembly between the separator 74 and the porous diffusion layer 57 is as small as possible.

As discussed above, the electrolytes for the zinc-air cells may include an aqueous electrolyte and a base, such as NaOH or KOH. According to various embodiments, the electrolyte may further include a surfactant system, a corrosion inhibitor (i.e., indium hydroxide, polyaniline, polyethylene glycol, polypropylene glycol, or lithium hydroxide), a gelling agent (i.e., polyacrylate polymer), gas suppressing additive (i.e.; zinc oxide, aluminum hydroxide, or calcium bromide), potassium hydroxide, sodium hydroxide, cesium hydroxide, boric acid, sodium borate, potassium borate, sodium stannate, potassium stannate, or a combination of any two or more thereof.

In one embodiment, the electrolyte may further include a surfactant including hexyl diphenyl oxide disulfonic acid, diethylenetriamine, octylphenoxypolyethoxyethanol, a compound of Formula (III), a compound, or a combinations of any two or more thereof.

Compounds of Formula (III) include:

Formula (III)

wherein $R^{13}$, $R^{14}$, $R^{15}$, $R^{16}$, $R^{17}$, $R^{18}$, $R^{19}$, $R^{20}$, and $R^{21}$ are each independently a hydrogen, alkyl, alkenyl, or cycloalkyl group; $X^2$ is O or S; $X^3$ is OH or SH; and w is 5-50. In some embodiments, R13, R14, R15, R16, R17, R18, R19, R20, and R21 are each hydrogen. In some embodiments, $X^2$ is O. In some embodiments, $X^3$ is OH. In some embodiments, w is 5-15. In some embodiments, w is 5-10. In some embodiments, $R^{13}$ is a $C_1$-$C_{12}$ alkyl group; $R^{14}$, $R^{15}$, $R^{16}$, $R^{17}$, $R^{18}$, $R^{19}$, $R^{20}$, and $R^{21}$ are each hydrogen; $X^2$ is O; $X^3$ is OH; and w is 5-15. In some embodiments, $R^{13}$ is octyl and w is 5-10. In another embodiment, $R^{13}$ is 1,1,3,3-tetramethylbutyl and w is 5-10.

In an embodiment, the electrolyte includes a combination of hexyl diphenyl oxide disulfonic acid and at least one amphoteric fluorosurfactant. In another embodiment, the electrolyte includes a combination of diethylenetriamine and at least one amphoteric fluorosurfactant. In another embodiment, the electrolyte includes a combination of octylphenoxypolyethoxyethanol and at least one amphoteric fluorosurfactant.

In an embodiment, the hexyl diphenyl oxide disulfonic acid surfactant reduces voltage suppression. In one embodiment, the hexyl diphenyl oxide disulfonic acid surfactant has a density of from about 9.0 to about 10.0 lbs./gallon. In another embodiment, the hexyl diphenyl oxide disulfonic acid surfactant has a density of about 9.8 lbs./gallon. In one embodiment, the hexyl diphenyl oxide disulfonic acid surfactant may also have a pH of less than about 2.0. In another embodiment, the hexyl diphenyl oxide disulfonic acid surfactant may have a solubility of about 50% in water.

In an embodiment, the hexyl diphenyl oxide disulfonic acid surfactant includes from about 70% to about 75%, by weight, of sulfonated benzene, 1,1'-oxybis-sec-hexyl derivatives. In another embodiment, the hexyl diphenyl oxide disulfonic acid surfactant may include from about 0% to about 5% or from about 2% to about 4%, by weight, of sulfuric acid. In another embodiment, the hexyl diphenyl oxide disulfonic acid surfactant may include from about 20% to about 30% or from about 22% to about 28%, by weight, of water. In an exemplary embodiment, the hexyl diphenyl oxide disulfonic acid surfactant is Calfax® 6LA-70, available from Pilot Chemical Company, 2744 East Kemper Road, Cincinnati, Ohio, 45241. In one embodiment, the Calfax® 6LA-70 is a surfactant, it can also act as a coupling agent and/or an HLB modifier in other embodiments of the present disclosure. Thus, the term "surfactant" is not to be seen in a limiting sense for the Calfax® 6LA-70, but, rather, is a description of one of the functions that hexyl diphenyl oxide disulfonic acids may provide.

In an embodiment, the hexyl diphenyl oxide disulfonic acid surfactant is present in an amount from about 500 ppm to about 5,000 ppm. This may include from about 1,000 ppm to about 4,000 ppm or about 2,000 ppm to about 3,000 ppm. In another embodiment, the hexyl diphenyl oxide disulfonic acid surfactant is present in an amount of about 1,000 ppm, about 2,000 ppm, about 3,000 ppm, about 4,000 ppm, or about 5,000 ppm, or ranges between any two of these values (including endpoints). In one embodiment, the hexyl diphenyl oxide disulfonic acid surfactant is present in an amount of about 3,000 ppm. In another embodiment, the hexyl diphenyl oxide disulfonic acid surfactant is present in an amount of about 4,500 ppm.

The electrolyte may further include a corrosion inhibitor. In some embodiments, the corrosion inhibitor is used to help maintain a clean zinc surface, which in turn increases cell voltage and efficiency. In some embodiments, both the corrosion inhibitor and the fluorosurfactant may provide improvements in cell voltage and cell performance. In another embodiment, the corrosion inhibitor may enhance conductivity.

The corrosion inhibitor may be present in the electrolyte from about 100 ppm to about 15,000 ppm. This may include from about 200 ppm to about 300 ppm. In another embodiment, the corrosion inhibitor is present in an amount of about 150 ppm, about 200 ppm, about 250 ppm, about 300 ppm, about 350 ppm, or ranges between any two of these values (including endpoints). In another embodiment, the corrosion inhibitor is present in an amount of about 250 ppm. With regard to the corrosion inhibitor only, the ppm amount is based upon the total weight of the electrolyte when the corrosion inhibitor is a liquid at room temperature, or it is based upon the zinc weight in the anode when the corrosion inhibitor is a solid at room temperature.

In an embodiment, the corrosion inhibitor is an aromatic amine polymer, indium hydroxide, polyaniline, polyethylene glycol, polypropylene glycol, lithium hydroxide, or a combination of any two or more thereof. In some embodiments, the corrosion inhibitor is a compound of Formula (II).

Formula (II)

wherein $R^9$, $R^{10}$, $R^{11}$, and $R^{12}$ are each independently a hydrogen, substituted or unsubstituted alkyl, substituted or unsubstituted alkenyl, or substituted or unsubstituted cycloalkyl group; and t is 100-500. In some embodiments, $R^9$, $R^{10}$, $R^{11}$, and $R^{12}$ are each hydrogen. In some embodiments, t is 100-200. In some embodiments, $R^9$, $R^{10}$, $R^{11}$ and $R^{12}$ are each hydrogen and m is 100-200.

In another embodiment the corrosion inhibitor is polyaniline. In some embodiments, the polyaniline corrosion inhibitor is an emeraldine polyaniline. In another embodiment, the polyaniline is a non-acid doped form of polyaniline and is not a conductive form of polyaniline. In some embodiments, the emeraldine form of polyaniline is neutral and has a high stability at room temperature. In some embodiments, the polyaniline may act as a corrosion inhibitor. In some embodiments, the polyaniline may provide other benefits that do not limit the polyaniline to acting just as a corrosion inhibitor. Thus, referring to the polyaniline as a "corrosion inhibitor" does not limit the polyaniline to only that particular function. For example, in some embodiments the polyaniline enhances conductivity.

In one embodiment, the corrosion inhibitor is indium hydroxide. In some embodiments, the indium hydroxide may be present in an amount from about 2,000 ppm to about 4,000 ppm based upon the total weight of the zinc in the anode. This may include from about 2,500 ppm to about 3,500 ppm, or from about 2,750 ppm to about 3,250 ppm. In another embodiment, the indium hydroxide may be present in an amount of about 2,000 ppm, about 2,500 ppm, about 3,000 ppm, about 3,500 ppm, about 4,000 ppm, or ranges between any two of these values (including endpoints). In another embodiment, the indium hydroxide may be present in an amount of about 3,000 ppm based upon the total weight of the zinc in the anode.

The electrolyte may include a gelling agent. Any suitable gelling agent in the art may be used so long as it does not depart from the scope of the present disclosure. In one embodiment, the gelling agent may be present in an amount from about 500 ppm to about 1,500 ppm, about 750 ppm to about 1,250, or about 900 ppm to about 1,100 ppm, based upon the total weight of the electrolyte. In another embodiment, the gelling agent is present in an amount of about 500 ppm, about 600 ppm, about 700 ppm, about 800 ppm, about 900 ppm, about 1,000 ppm, about 1,100 ppm, about 1,200 ppm, about 1,300 ppm, about 1,400 ppm, or about 1,500 ppm, or ranges between any two of these values (including endpoints). In another embodiment, the gelling agent is present in an amount of about 1,000 ppm. In one embodiment, a suitable gelling agent is a polyacrylic acid polymer. In one embodiment, the polyacrylic acid is a cross-linked polyacrylic acid polymer.

The electrolyte may include a polyacrylate polymer. The polyacrylate polymer may be present in an amount from about 1,000 ppm to about 5,000 ppm. This may include from about 2,000 ppm to about 4,000 ppm, or from about 2,500 ppm to about 3,500 ppm. In another embodiment, the polyacrylate polymer may be present in an amount of about 2,000 ppm, about 2,500 ppm, about 3,000 ppm, about 3,500 ppm, about 4,000 ppm, or ranges between any two of these values (including endpoints). In another embodiment, the polyacrylate polymer may be present in an amount of about 2,000 ppm. In some embodiments, a suitable polyacrylate polymer is a cross-linked polyacrylate polymer.

The electrolyte may include a gas suppressing additive. In one embodiment, the electrolyte may include from about 500 ppm to about 20,000 ppm of a gas suppressing additive. In one embodiment, the gas suppressing additive is zinc oxide.

Zinc oxide may be present in an amount from about 1% to about 10%, by weight of the electrolyte. This may include about 1% to about 8%, 1% to about 5%, about 1.5 to about 5%, or about 2 to about 5%, by weight of the electrolyte. In one embodiment, the zinc oxide may be present in an amount of about 1%, about 1.5%, about 2%, about 2.5%, about 3%, about 3.5%, or about 4%, by weight of the electrolyte, or ranges between any two of these values (including endpoints). In one embodiment, the zinc oxide may be present in an amount of about 2%, by weight of the electrolyte. In some embodiments, the zinc oxide may provide other benefits that do not limit the zinc oxide to acting just as a gas suppressing additive. Thus, referring to the zinc oxide as a "gas suppressing additive" does not limit the zinc oxide to only that particular function. For example, in some embodiments the zinc oxide regulates zinc surface passivation.

The electrolyte may include potassium hydroxide. In one embodiment, the potassium hydroxide is present in an amount of from about 20% to about 45%, by weight of the electrolyte. This may include from about 25% to about 40% or from about 30% to about 35%, by weight of the electrolyte. In one embodiment, the potassium hydroxide is present in an amount of about 45%, about 30%, about 25%, or about 20%, by weight of the electrolyte, or ranges between any two of these values (including endpoints). In another embodiment, the potassium hydroxide is present in an amount of about 33%, by weight of the electrolyte.

The electrolyte may include sodium hydroxide. In one embodiment, the sodium hydroxide is in present in an amount of from about 20% to about 45%. This may include from about 25% to about 40% or from about 30% to about 35%, by weight of the electrolyte. In one embodiment, the sodium hydroxide is present in an amount of about 45%, about 30%, about 25%, or about 20%, by weight of the electrolyte, or ranges between any two of these values (including endpoints). In another embodiment, the sodium hydroxide is present in an amount of about 33%, by weight of the electrolyte.

In an embodiment, the zinc-air battery includes an electrolyte, wherein the electrolyte includes a surfactant system and a corrosion inhibitor. In some embodiments, the surfactant system includes an amphoteric fluorosurfactant. In another embodiment, the surfactant system further includes a gas suppressing additive. In another embodiment, the surfactant system further includes hexyl diphenyl oxide disulfonic acid, diethylenetriamine, or octylphenoxypolyethoxyethanol, a compound of Formula (III), or a combination of any two or more thereof.

In an embodiment, the negative electrode includes an anode, an anode active material, and an anode can assembly that surrounds the active material. In some embodiments, the anode active material includes zinc and the anode is referred to as a "zinc anode." In this regard, it is to be noted that, as used herein, anode "active material" may refer to a single chemical compound that is part of the discharge reaction at the anode of a cell and contributes to the cell discharge capacity, including impurities and small amounts of other moieties that may be present therein. Anode "active material" does not include current collectors, electrode leads, etc., that may contain or support the zinc active material.

An anode may be provided that includes a combination of electrolyte components. In some embodiments, the electrolyte includes at least one amphoteric fluorosurfactant, in addition to one or more of a corrosion inhibitor, a gelling agent, gas suppressing additive, potassium hydroxide, sodium hydroxide, calcium bromide, cesium hydroxide, boric acid, sodium borate, potassium borate, sodium stannate, potassium stannate, and at least one amphoteric fluorosurfactant. Illustrative amphoteric fluorosurfactant include, but are not limited to, CHEMGUARD® S-111, CHEMGUARD® S-500, CAPSTONE® FS-50, CAPSTONE® FS-51, APFS-14, DYNAX DX3001, ZONYL® FSK, ZONYL® FS-500, or a combination of any two or more thereof. In some embodiments, the combination of the components in the anode provides for an enhanced improvement in cell voltage and cell performance.

Physical modifications to the anode may also improve cell service life, either alone or in combination with chemical modifications noted above. For example, one can efficiently discharge cells having an advantageously lower concentration of hydroxide ions in the electrolyte than can be used in conventional cells by reducing diffusion resistance for the hydroxide ions. This can be accomplished, for example, by adjusting the zinc particle size distribution to provide in the anode a narrow distribution of similar zinc particle sizes, thereby enhancing porosity (diffusion paths) for the hydroxide ions. In addition to improving diffusion properties, the particle size distributions of this disclosure also provide the porosity sites for the precipitation of ZnO, thereby delaying anode passivation. This approach is effective for use in the anodes of zinc air battery cells and can be used in combination with other improvements disclosed herein.

Suitable zinc particle size distribution is one in which at least 70% of the particles have a standard mesh-sieved particle size within a 100 micron size range and in which the mode of the distribution is between about 100 and about 300 microns. In one embodiment, a suitable zinc particle size distribution includes particle size distributions meeting the above-noted tests and having a mode of 100 microns, 150 microns, or 200 microns, each plus or minus about 10%. In one embodiment, about 70% of the particles are distributed in a size distribution range narrower than about 100 microns, for example about 50 microns, or about 40 microns, or less.

The positive electrode may include a cathode can assembly 40, which includes a cathode can 44 and the cathode 42. An exemplary embodiment of the cathode 42 is best seen in FIG. 1. An active layer 72 of the cathode 42 is interposed between the separator 74 and the porous diffusion layer 57. Active layer 72 ranges preferably between about 50 microns and about 1,250 microns thick, and facilitates the reaction between the hydroxyl ions in the electrolyte and the cathodic oxygen of the air. Separator 74 may include one or both of a micro-porous plastic membrane and a micro-porous cellulosic paper. Such a micro-porous plastic membrane is about 25 microns thick and typically includes polypropylene. An exemplarly micro-porous cellulosic paper is 80-85 microns thick with a basis weight of 20 to 25 g/m$^2$, typically composed of polyvinyl alcohol and cellulosic material. The separator has the primary function of preventing anodic zinc particles from coming into physical contact with the remaining elements of the cathode 42. Separator 74 however, does permit passage of hydroxyl ions and water therethrough to the cathode assembly. Here, the cathode is an air cathode and the cathode active layer includes carbon.

The side wall 47 of the cathode can 44 is joined to the bottom 46 of the can by intermediate element 80. The outer surface of intermediate element 80 extends, from its lower end at outer perimeter 52 of outer surface 50 of bottom 46, to its upper end which joins the outer surface 58 of the side wall 47 in a generally vertical orientation. The inner surface, if any, of the intermediate element 80 is represented at the joinder of the inner surface 48 of the bottom 46 and the inner surface 56 of the side wall 47. In some embodiments, the inner surfaces 48 and 56 come together at a sharp corner, such that the inner surface of the intermediate element is of nominal dimension. In some embodiments, to the extent the corner material is worked in forming the corner, the corner is work hardened, whereby the corner structure is strengthened with respect to bottom 46 and side wall 47 as the corner structure is formed at intermediate element 80.

In an embodiment, the cathode can may be formed entirely of a metal or alloy having a hydrogen overvoltage similar to that of the cathode (as opposed to plating or cladding the can) so long as sufficient strength and ductility are available from the material selected. Materials in addition to nickel, having such hydrogen overvoltage properties, include, for example and without limitation, cobalt and gold. In some embodiments, such materials may be coated as one or more coating layers onto the core layer by, for example, plating, cladding, or other application processes. The materials which provide sufficient strength and ductility may also be used as single layer materials in place of the composite structure. Single layer materials comprehend CRS or other suitable material as a core layer.

In an embodiment, steel strip plated with nickel and nickel alloy may be used because of cost considerations, and because pre-plated steel strip, which generally requires no post-plating processes, is commercially available. The metal in the can is preferably both ductile enough to withstand the drawing process, and strong and rigid enough, to tolerate and otherwise withstand the cell crimping and closure process as well as to provide primary overall structural strength to the cell.

In an embodiment, cathode cans may be made of nickel-plated stainless steel. In another embodiment, materials for cathode cans include nickel-clad stainless steel; cold-rolled steel plated with nickel; INCONEL® (a non-magnetic alloy of nickel); pure nickel with minor alloying elements (e.g. Nickel 200 and related family of Nickel 200 alloys such as Nickel 201, etc.), all available from Huntington Alloys, or DURANICKEL® 301, available from Special Metals. In one embodiment, some noble metals may also find use as plating, cladding, or other coating for can metals, including covering steel strip plated with nickel, and mild steel strip subsequently plated with nickel after fabricating the can.

In an embodiment, where multiple layers are used (e.g., CRS) coated on opposing sides with nickel, the present disclosure contemplates additional (e.g. fourth, fifth, etc.) layers, either between the nickel and CRS, or with a nickel layer between the CRS and the additional layer(s). For example, gold, cobalt, or other excellent electrical conductor can be deposited on some or all of the outer surface of the cathode can (outside the nickel layer) after the can is drawn, or drawn and ironed. As an alternative, such fourth etc. layer can be, for example, a bond-enhancing layer between the CRS and the nickel.

In an embodiment, where the can is fabricated using a typical raw material structure of nickel/stainless steel (SST)/nickel/NI/SST/NI as the sheet structure, such sheet structure is from about 0.002 inch to about 0.012 inch. This may include about 0.003 inch to about 0.010 inch or about 0.004 inch to about 0.006 inch. In some embodiments, the thickness is about 0.002 inch, about 0.003 inch, about 0.004 inch, about 0.005 inch, or about 0.006 inch. In some embodiments, the thickness is about 0.005 inch. In some embodiments, each of the nickel layers represents about 1% to about 10%, of the overall thickness of the metal sheet in such 3-layer structure. This may include about 1.5% to about 9%, about 2% to about 8%, about 2.5% to about 7%, or about 3% to about 6.5%, of the overall thickness of the metal sheet in such 3-layer structure. In some embodiments, each of the nickel layers represents about 2% to about 4%, of the overall thickness of the metal sheet in such 3-layer structure. In some embodiments, each of the nickel layers represents about 2%, of the overall thickness of the metal sheet in such 3-layer structure.

EXAMPLES

The examples herein are provided to illustrate advantages of the present technology and to further assist a person of ordinary skill in the art with preparing and/or using the present technology. The examples herein are also presented in order to more fully illustrate the preferred aspects of the present technology. The examples should in no way be construed as limiting the scope of the present technology. The examples can include or incorporate any of the variations, aspects, or embodiments of the present technology described above. The variations, aspects, or embodiments described above may also further each include or incorporate the variations of any or all other variations, aspects or embodiments of the present technology.

In the following examples, zinc-air battery cells were prepared and tested.

Example 1: Preparation of 5% (By Weight) Lithium Hydroxide Solution

A 250 mL polypropylene bottle was filled with 100 g of water. 11.1 g of lithium hydroxide monohydrate were added to the beaker and mixed on a magnetic stirplate until the solution was fully dissolved.

Example 2: Preparation of 10% (By Weight) Lithium Hydroxide Solution

A 250 mL polypropylene bottle was filled with 100 g of water. 22.2 g of lithium hydroxide monohydrate were added to the beaker and mixed on a magnetic stirplate until the solution was fully dissolved.

Example 3: Preparation of Control Diffusion Pad

A diffusion pad was prepared by punching a disc from a strip made of polyvinyl alcohol and rayon fibers. This disc was glued to the interior of a cathode can cavity.

Example 4: Preparation of 5% LiOH Pre-Soaked Diffusion Pad—Method 1

A strip made of polyvinyl alcohol and rayon fibers was immersed in a magnetically stirred solution of 5% lithium hydroxide (described in Example 1). The PVA-rayon strip was soaked in the solution at room temperature (21° C.) for 16 h. The strip was then removed from the solution, placed in a stainless steel pan, and placed in an oven for 1 hour at 30° C. to dry. Upon drying, the strip was lightly tapped with a gloved hand to remove any excess lithium hydroxide crystals at the edge of the strip. A diffusion pad was prepared by punching a disc from this strip. This disc was glued to the interior of a cathode can cavity.

Example 5: Preparation of 10% LiOH Pre-Soaked Diffusion Pad—Method 2

A strip made of polyvinyl alcohol and rayon fibers was immersed in a magnetically stirred solution of 10% lithium hydroxide (described in Example 2). The PVA-rayon strip was soaked in the solution at room temperature (21° C.) for 16 h. The strip was then removed from the solution, placed in a stainless steel pan, and placed in an oven for 1 hour at 30° C. to dry. Upon drying, the strip was lightly tapped with a gloved hand to remove any excess lithium hydroxide crystals at the edge of the strip. A diffusion pad was prepared by punching a disc from this strip. This disc was glued to the interior of a cathode can cavity.

Example 6: Preparation of 10% LiOH Droplet Soaked Diffusion Pad—Method 3

A diffusion pad was prepared by punching a disc from a strip made of polyvinyl alcohol and rayon fibers. This disc was glued to the interior of a cathode can cavity. The diffusion pad was then wetted using a precision fluid dispenser with enough 10% lithium hydroxide solution (described in Example 2) to fully soak the pad.

Example 7: Preparation of the Control Battery Cell

A control cell was prepared having a can and diffusion pad as described in Example 3.

Example 8: Preparation of Battery Cell with Carbon Dioxide-Scrubbing Diffusion Pads A cell was prepared having a zinc anode as described in can and diffusion pad as described in Examples 4 through 6.

Example 9: Battery Testing

Electrochemical cells may be tested in accordance with several methods under the American National Standards Institute (ANSI) testing standards. For primary hearing aid batteries using aqueous electrolytes, an ANSI tests known as the hearing aid standard test is used to determine cell performance and longevity. Exemplary zinc-air cells according to the present technology (preparation described in Example 8) as well as a control zinc-air cell (Example 7) were tested under the hearing aid standard discharge test, using the following test protocol:

Hearing aid standard test involves applying a constant current load of 10 mA for 100 milliseconds followed by a 2 mA load for 119 min, 59 seconds and 900 milliseconds repeated 6 times, thereafter followed by a 12 hour rest period. The daily cycle is 12 h on load followed by 12 h off load (or under rest period). The cycle is repeated until the cell operating voltage drops below 1.05 V. Hearing aid standard test was performed in a chamber which allowed for the concentration of carbon dioxide to be controlled.

An initial series of experiments assessed how increases in the concentration of carbon dioxide in the atmosphere might affect the cell-life of standard zinc-air cells (i.e., without a carbon dioxide scrubbing agent; Example 7). As illustrated in Table 1, a $CO_2$ concentration of 450 ppm was used as a benchmark to normalize higher concentrations of $CO_2$. Table 1 illustrates the significant negative effects that $CO_2$ has on zinc-air cell-life via the significant reduction of capacity following the hearing aid standard test.

TABLE 1

Zinc-air cell[1] capacity on Hearing aid standard pulse[2] as affected by [$CO_2$]

| [$CO_2$] (ppm) | Capacity (mAh to 1.05 V) | Normalized Capacity (450 ppm at 100%) |
|---|---|---|
| 450 | 179 | 100% |
| 1000 | 163 | 91% |
| 2500 | 105 | 59% |
| 5000 | 52 | 29% |

[1]All capacities are for a size 312 cell
[2]10/2 mA 2 h 100 ms 12 h/d

Figure 5:
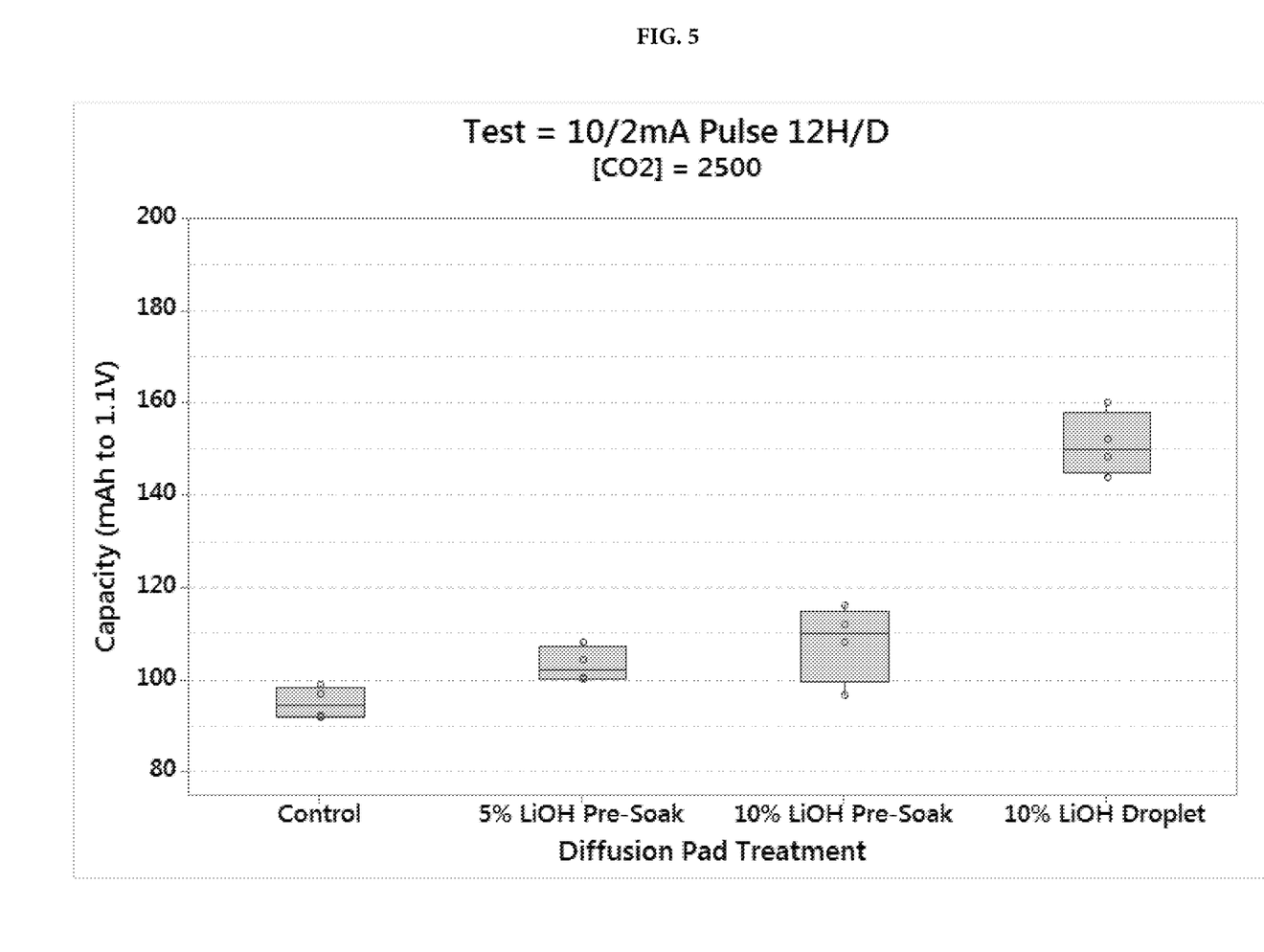
FIG. 5 provides the effects on capacity for various embodiments of a zinc-air battery of the present technology as compared to a similar zinc-air battery that included an untreated diffusion pad ("Control") upon subjecting the batteries to a hearing aid standard test where the concentration of $CO_2$ was 2,500 ppm, according to the working examples.
Figure 6:
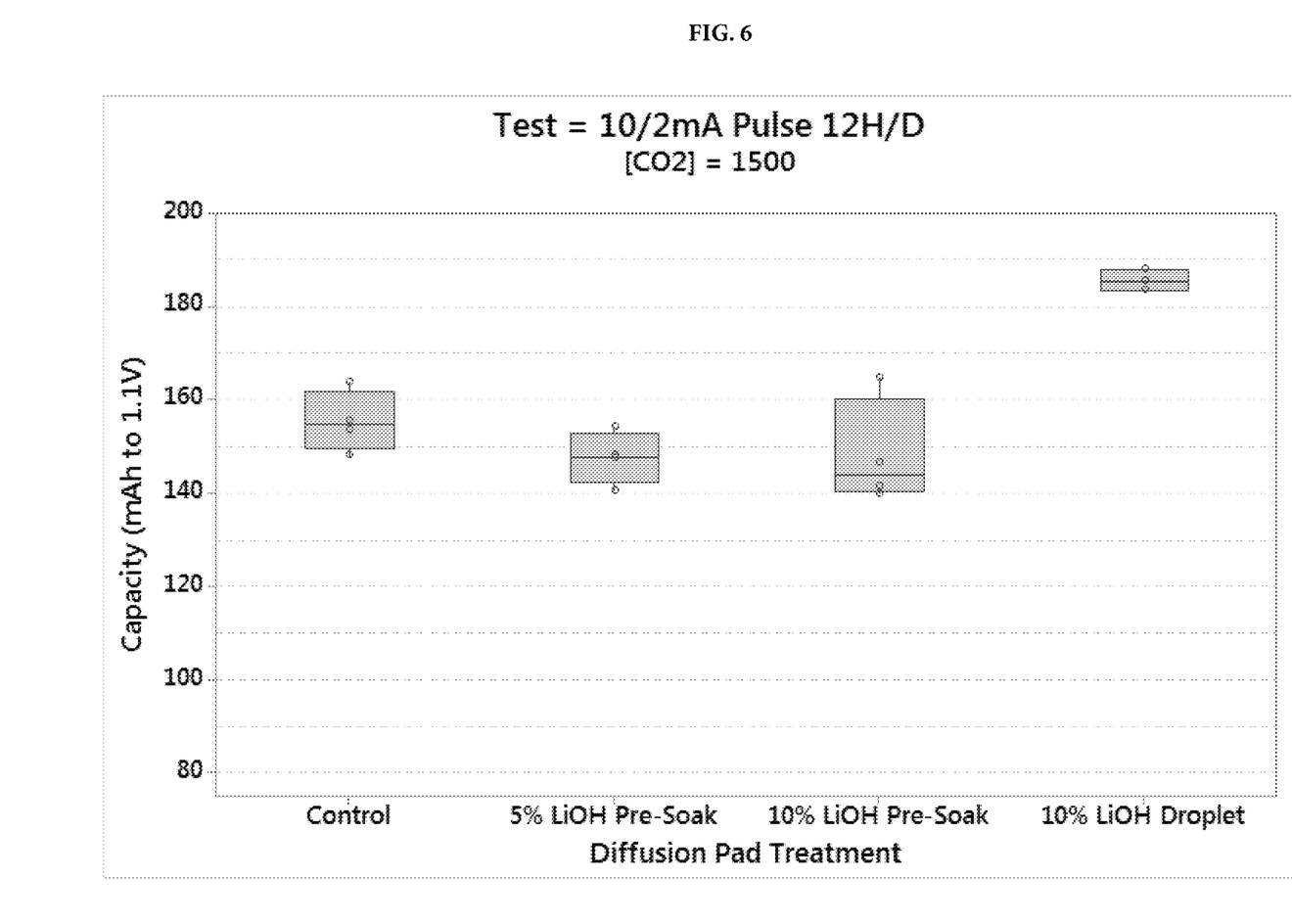
FIG. 6 provides the effects on capacity for various embodiments of a zinc-air battery of the present technology as compared to a similar zinc-air battery that included an untreated diffusion pad ("Control") upon subjecting the batteries to a hearing aid standard test where the concentration of $CO_2$ was 1,500 ppm, according to the working examples.

FIGS. 2-6 compare the performance tests of cells containing diffusion pads seeded with a carbon dioxide scrubbing agent (preparation described in Example 8) against those of the conventional cell containing a standard diffusion pad (Example 7) on the hearing aid standard test. The cells containing diffusion pads seeded with a carbon dioxide scrubbing agent clearly exhibit superior discharge capacity at elevated carbon dioxide concentrations. The cells containing diffusion pads seeded with a carbon dioxide scrubbing agent also exhibit superior discharge capacity at ambient carbon dioxide concentrations (about 400-500 ppm $CO_2$; data not shown). As further illustrated by comparing FIG. 5 to FIGS. 3 and 4 as well as illustrated in FIGS. 5 & 6, inclusion of water with a carbon dioxide scrubbing agent further enhances the advantageous effects of carbon dioxide scrubbing agent. Such inclusion of water would be expected to occur upon exposure of the diffusion pads of the zinc-air batteries of the present technology to normal atmosphereic conditions. Thus, the present technology provides zinc-air cells with significantly enhanced cell-life and discharge capacity.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present technology may include, but is not limited to, the features and combinations of features recited in the following lettered paragraphs, it being understood that the following paragraphs should not be interpreted as limiting the scope of the claims as appended hereto or mandating that all such features must necessarily be included in such claims:

A. A zinc-air battery comprising an air cathode, a zinc anode, an electrolyte, and a housing, wherein the zinc-air battery comprises a carbon dioxide scrubbing agent.

B. The zinc-air battery of Paragraph A, wherein the carbon dioxide scrubbing agent comprises a basic hydroxide salt, soda lime, sodium bicarbonate, lithium peroxide, lithium oxide, an amine-bearing compound, an olivine, or a combination of any two or more of thereof.

C. The zinc-air battery of Paragraph A or Paragraph B, wherein the carbon dioxide scrubbing agent comprises lithium hydroxide, potassium hydroxide, sodium hydroxide, calcium hydroxide, soda lime, sodium bicarbonate, lithium peroxide, lithium oxide, monoethanolamine, diethanolamine, an olivine, or a combination of any two or more of thereof.

D. The zinc-air battery of any one of Paragraphs A-C, wherein the carbon dioxide scrubbing agent is combined with a hygroscopic material.

E. The zinc-air battery of Paragraph D, wherein the hygroscopic material comprises a polyvinyl alcohol, a polyacrylic acid, a carboxylmethyl cellulose, or a combination of any two or more thereof.

F. The zinc-air battery of Paragraph D or Paragraph E, wherein the hygroscopic material increases access of the carbon dioxide scrubbing agent to water.

G. The zinc-air battery of any one of Paragraphs A-F, wherein water is associated with the carbon dioxide scrubbing agent.

H. The zinc-air battery of any one of Paragraphs A-G, wherein the carbon dioxide scrubbing agent is dissolved in water.

I. The zinc-air battery of any one of Paragraphs A-H, wherein the zinc-air battery further comprises an air diffusion pad and the air diffusion pad comprises the carbon dioxide scrubbing agent.

J. The zinc-air battery of any one of Paragraphs A-I, wherein an interior surface of the housing comprises a coating of the carbon dioxide scrubbing agent.

K. The zinc-air battery of any one of Paragraphs A-J, wherein battery comprises an air reservoir defined by the housing and an air diffusion layer within the cell, and the carbon dioxide scrubbing agent is deposited on a surface of the air reservoir as a powder or a film.

L. The zinc-air battery of any one of Paragraphs A-K, wherein the carbon dioxide scrubbing agent is embedded on a surface of the air cathode.

M. The zinc-air battery of any one of Paragraphs A-K, wherein the air cathode comprises or consists of the carbon dioxide scrubbing agent.

N. The zinc-air battery of any one of Paragraphs A-M, wherein the carbon dioxide scrubbing agent is dissolved or suspended in the electrolyte.

O. The zinc-air battery of any one of Paragraphs A-N, wherein the carbon dioxide scrubbing agent is mixed into or coated onto the zinc anode.

P. A packaging for a zinc-air battery, wherein the packing comprises a chamber comprising a carbon dioxide scrubbing agent, and the chamber is configured to contain the zinc-air battery during storage.

Q. The packaging of Paragraph P, wherein a tab adhesive comprises the carbon dioxide scrubbing agent.

R. The packaging of Paragraph P or Paragraph Q, wherein the carbon dioxide scrubbing agent a basic hydroxide salt, soda lime, sodium bicarbonate, lithium peroxide, lithium oxide, an amine-bearing compound, an olivine, or a combination of any two or more of thereof.

S. The packaging of any one of Paragraphs P-R, wherein the carbon dioxide scrubbing agent comprises lithium hydroxide, potassium hydroxide, sodium hydroxide, calcium hydroxide, soda lime, sodium bicarbonate, lithium peroxide, lithium oxide, monoethanolamine, diethanolamine, an olivine, or a combination of any two or more of thereof.

T. The packaging of any one of Paragraphs P-S, wherein the carbon dioxide scrubbing agent is combined with a hygroscopic material.

U. The packaging of Paragraph T, wherein the hygroscopic material comprises a polyvinyl alcohol, a polyacrylic acid, a carboxylmethyl cellulose, or a combination of any two or more thereof.

V. The packaging of Paragraph T or Paragraph U, wherein the hygroscopic material increases access of the carbon dioxide scrubbing agent to water.

W. The packaging of any one of Paragraphs P-V, wherein water is associated with the carbon dioxide scrubbing agent.

X. The packaging of any one of Paragraphs P-W, wherein the carbon dioxide scrubbing agent is dissolved in water.

Other embodiments are set forth in the following claims.

What is claimed is:

1. A zinc-air battery comprising an air cathode, a zinc anode, an electrolyte, and a housing, wherein:
    the housing comprises an anode can and a cathode can with an insulating gasket therebetween;
    the cathode can comprises multiple air ports;
    the anode can defines an anode chamber;
    the zinc-air battery comprises a cellulose air diffusion layer between the cathode can and the anode chamber;
    an air reservoir is defined by the cathode can and the cellulose air diffusion layer having a first face proximal to the air reservoir and an opposite and second face proximal to a porous diffusion layer;
    wherein the air reservoir and the cellulose air diffusion layer comprise a carbon dioxide scrubbing agent comprising a film or powder of lithium hydroxide combined with a hygroscopic material comprising polyvinyl alcohol.

2. The zinc-air battery of claim 1, wherein the carbon dioxide scrubbing agent further comprises a basic hydroxide salt, soda lime, sodium bicarbonate, lithium peroxide, lithium oxide, an amine-bearing compound, an olivine, or a combination of any two or more of thereof.

3. The zinc-air battery of claim 1, wherein the carbon dioxide scrubbing agent further comprises potassium hydroxide, sodium hydroxide, calcium hydroxide, soda lime, sodium bicarbonate, lithium peroxide, lithium oxide, monoethanolamine, diethanolamine, an olivine, or a combination of any two or more of thereof.

4. The zinc-air battery of claim 1, wherein the hygroscopic material further comprises a polyacrylic acid, a carboxylmethyl cellulose, or a combination thereof.

5. The zinc-air battery of claim 1, wherein the carbon dioxide scrubbing agent is embedded on a surface of the air cathode.

6. The zinc-air battery of claim 1, wherein the air cathode comprises the carbon dioxide scrubbing agent.

7. The zinc-air battery of claim 1, wherein the hygroscopic material comprises polyvinyl alcohol and rayon fibers.

* * * * *